(12) United States Patent
Kido et al.

(10) Patent No.: US 10,745,783 B2
(45) Date of Patent: Aug. 18, 2020

(54) CEMENTED CARBIDE AND CUTTING TOOL

(71) Applicant: SUMITOMO ELECTRIC HARDMETAL CORP., Itami-shi (JP)

(72) Inventors: Yasuki Kido, Itami (JP); Daiji Tabayashi, Itami (JP); Shinya Imamura, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 0 days.

(21) Appl. No.: 16/305,445

(22) PCT Filed: Jul. 2, 2018

(86) PCT No.: PCT/JP2018/025060
§ 371 (c)(1),
(2) Date: Nov. 29, 2018

(87) PCT Pub. No.: WO2019/116614
PCT Pub. Date: Jun. 20, 2019

(65) Prior Publication Data
US 2019/0233922 A1 Aug. 1, 2019

(30) Foreign Application Priority Data
Dec. 11, 2017 (JP) .................. 2017-236855

(51) Int. Cl.
| C22C 29/08 | (2006.01) |
| B23C 5/20 | (2006.01) |
| C22C 29/06 | (2006.01) |
| B22F 5/00 | (2006.01) |

(52) U.S. Cl.
CPC .............. *C22C 29/08* (2013.01); *B23C 5/20* (2013.01); *C22C 29/067* (2013.01); *B22F 2005/001* (2013.01); *B23C 2222/28* (2013.01)

(58) Field of Classification Search
CPC .......... C22C 29/08; C22C 29/067; B23C 5/20
(Continued)

(56) References Cited

U.S. PATENT DOCUMENTS

2009/0044415 A1* 2/2009 Fujino .................... C22C 29/02
30/345
2012/0144753 A1* 6/2012 Okuno .................... C22C 29/08
51/295

(Continued)

FOREIGN PATENT DOCUMENTS

| JP | 2004-256852 A | 9/2004 |
| JP | 2005-068515 A | 3/2005 |

(Continued)

OTHER PUBLICATIONS

Yousfi, Microstructure Development of WC-Co Based Cemented Carbides During Creep Testing, 2016, Chalmers University of Techology, URL: <http://publications.lib.chalmers.se/records/fulltext/235796/235796.pdf>, pp. i-x, 1-43 (Year: 2016).*

(Continued)

*Primary Examiner* — Humera N. Sheikh
*Assistant Examiner* — Katherine A Christy
(74) *Attorney, Agent, or Firm* — Baker Botts L.L.P.; Michael A. Sartori

(57) ABSTRACT

A cemented carbide comprising a first hard phase composed of tungsten carbide particles and a binder phase including Co, the cemented carbide having a ratio Nt/Na of 0.9 or more, where, in any surface or any cross section of the cemented carbide, a region in which there is a distance X of 5 nm or less between surfaces respectively of tungsten carbide particles adjacent to each other, the surfaces facing each other along a length L of 100 nm or more, is referred to as a WC/WC interface, and Na represents a total number of WC/WC interfaces and Nt represents a number of (Continued)

WC/WC interfaces having distance X of 1 nm or more and 5 nm or less and having therein an atomic percentage of Co higher than an average value of atomic percentages of Co in the tungsten carbide particles.

9 Claims, 2 Drawing Sheets

(58) Field of Classification Search
USPC .......................................................... 428/688
See application file for complete search history.

(56) References Cited

U.S. PATENT DOCUMENTS

2018/0169766 A1* 6/2018 Yamamoto ............ B23B 27/148
2018/0222804 A1* 8/2018 Kido .................... B23B 27/148

FOREIGN PATENT DOCUMENTS

JP     2017-088917 A     5/2017
WO     2016/203674 A1    12/2016
WO     2017/191744 A1    11/2017

OTHER PUBLICATIONS

Liu et al., Reinforcement of tungsten carbide grains by nanoprecipitates in cemented carbides, Sep. 9, 2016, Nanotechnology 27, URL: <https://iopscience.iop.org/article/10.1088/0957-4484/27/41/415710/pdf>, pp. i, 1-9 (Year: 2016).*

Saito et al., Effects of Co content and WC grain size on wear of WC cemented carbide, Nov. 4, 2005,, Wear, 261, URL: <https://www.sciencedirect.com/science/article/pii/S0043164805004588>, pp. 126-132 (Year: 2005).*

* cited by examiner

CEMENTED CARBIDE AND CUTTING TOOL

TECHNICAL FIELD

The present invention relates to a cemented carbide and a cutting tool. The present application claims priority based on Japanese Patent Application No. 2017-236855 filed on Dec. 11, 2017. The contents described in the Japanese patent application are all incorporated herein by reference.

BACKGROUND ART

Conventionally, a cemented carbide comprising a hard phase containing tungsten carbide (WC) as a major component and a binder phase containing an iron group element as a major component has been used as a material for cutting tools. Properties required for cutting tools include strength (for example, transverse rupture strength), toughness (for example, fracture toughness), hardness (for example, Vickers hardness), plastic deformation resistance, abrasion resistance, and the like.

For example, Japanese Patent Laying-Open No. 2004-256852 (Patent Literature 1) discloses a cemented carbide enhanced in hardness and strength by having a structure including a binder phase containing chromium having a percentage gradually increasing toward an interface with tungsten carbide particles. Furthermore, Japanese Patent Laying-Open No. 2005-068515 (Patent Literature 2) discloses a fine-particle cemented carbide enhanced in toughness by concentrating Ta in the vicinity of the interface of a binder phase mainly composed of Co and a hard dispersed phase mainly composed of WC and in the vicinity of the interface of hard dispersed phases. Furthermore, Japanese Patent Laying-Open No. 2017-088917 (Patent Literature 3) discloses a cemented carbide enhanced in breaking resistance by having a surface portion with a layer free of a β phase of a compound such as TiC and TaC (including a solid solution thereof) and substantially formed of tungsten carbide particles and a binder phase (an iron group metal).

CITATION LIST

Patent Literature

PTL 1: Japanese Patent Laying-Open No. 2004-256852
PTL 2: Japanese Patent Laying-Open No. 2005-068515
PTL 3: Japanese Patent Laying-Open No. 2017-088917

SUMMARY OF INVENTION

A cemented carbide according to the present disclosure is a cemented carbide comprising a first hard phase comprising tungsten carbide particles and a binder phase including Co, the cemented carbide having a ratio Nt/Na of 0.9 or more, where, in any surface or any cross section of the cemented carbide, a region in which there is a distance X of 5 nm or less between surfaces respectively of tungsten carbide particles adjacent to each other, the surfaces facing each other along a length L of 100 nm or more, is referred to as a WC/WC interface, and Na represents a total number of WC/WC interfaces and Nt represents a number of WC/WC interfaces having distance X of 1 nm or more and 5 nm or less and having therein an atomic percentage of Co higher than an average value of atomic percentages of Co in the tungsten carbide particles.

A cutting tool according to the present disclosure includes a cemented carbide according to the present disclosure as a substrate.

DETAILED DESCRIPTION

Figure 1:
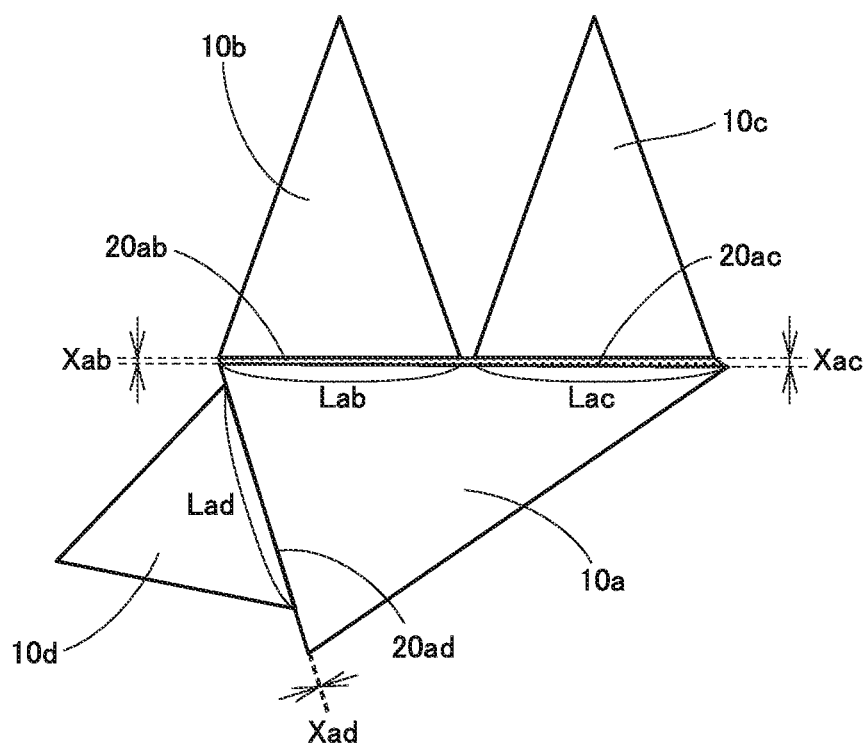
FIG. 1 is a schematic diagram showing a structure of a cemented carbide according to an embodiment.

Problem to be Solved by the Present Disclosure

In recent years, in the field of cutting processing, cutting tools are used in severe conditions as workpieces are increasingly difficult to cut and also worked into increasingly complicated shapes. For this reason, cemented carbides used as substrates for cutting tools are also required to have a variety of improved properties. In particular, a cemented carbide having large toughness is desired.

Accordingly, one object of the present disclosure is to provide a cemented carbide excellent in toughness. Another object of the present disclosure is to provide a cutting tool excellent in toughness.

Advantageous Effect of the Present Disclosure

The above cemented carbide and the above cutting tool are excellent in toughness.

Description of Embodiments

Initially, the contents of one aspect of the present disclosure will be enumerated.

[1] A cemented carbide in one aspect of the present disclosure is a cemented carbide comprising a first hard phase composed of tungsten carbide particles and a binder phase including Co, the cemented carbide having a ratio Nt/Na of 0.9 or more, where, in any surface or any cross section of the cemented carbide, a region in which there is a distance X of 5 nm or less between surfaces respectively of tungsten carbide particles adjacent to each other, the surfaces facing each other along a length L of 100 nm or more, is referred to as a WC/WC interface, and Na represents a total number of WC/WC interfaces and Nt represents a number of WC/WC interfaces having distance X of 1 nm or more and 5 nm or less and having therein an atomic percentage of Co higher than an average value of atomic percentages of Co in the tungsten carbide particles.

The cemented carbide in which a number of WC/WC interfaces having distance X of 1 nm or more and 5 nm or less and having therein an atomic percentage of Co higher than an average value of atomic percentages of Co in tungsten carbide particles has a predetermined ratio to a total number of WC/WC interfaces is excellently tough and suppresses cracking caused by thermal shock. It is believed that in the WC/WC interface having distance X of 1 nm or more and 5 nm or less and having therein an atomic percentage of Co higher than an average value of atomic percentages of Co in tungsten carbide particles, adhesion strength of tungsten carbide particles constituting the WC/WC interface is increased. That is, when Na represents a total number of WC/WC interfaces and Nt represents a number Nt of WC/WC interfaces having distance X of 1 nm or more and 5 nm or less and having therein an atomic percentage of Co higher than an average value of atomic percentages of Co in tungsten carbide particles, ratio Nt/Na of 0.9 or more allows the cemented carbide as a whole to have increased adhesion strength of tungsten carbide particles. As a result, it is estimated that the cemented carbide is improved in toughness and also enhanced in resistance to cracking caused by thermal shock.

[2] Ratio Nt/Na is 0.94 or more. The cemented carbide thus defined can be further excellent in toughness.

[3] The tungsten carbide particles have an average particle diameter of 0.5 μm or more and 5.0 μm or less. The cemented carbide thus defined ensures that a cutting tool manufactured with the cemented carbide used as a material can balance hardness and toughness as a cutting tool.

[4] Relative to any surface or any cross section of the cemented carbide
the first hard phase has an area ratio of 70% to 95% and
the binder phase including Co has an area ratio of 5% to 30%, and
a sum of the area ratio of the first hard phase and the area ratio of the binder phase including Co is 100%. The cemented carbide thus defined ensures that a cutting tool manufactured with the cemented carbide used as a material can balance hardness and toughness as a cutting tool.

[5] The cemented carbide further comprises a second hard phase composed of a compound including tungsten, one or more types of metal elements selected from Group 4 elements, Group 5 elements and Group 6 elements of the Periodic Table excluding tungsten, and one or more types of elements selected from C, N, O and B, and
in the second hard phase, one or more types of metal elements selected from Group 4 elements, Group 5 elements and Group 6 elements of the Periodic Table excluding tungsten have a mass ratio of 20 mass % or more and less than 100 mass % relative to a total amount of tungsten and one or more types of metal elements selected from Group 4 elements, Group 5 elements and Group 6 elements of the Periodic Table excluding tungsten. The cemented carbide thus defined can suppress cracking caused by thermal shock or mechanical impact and also enhance resistance to oxidation and anti-reactivity against a workpiece while maintaining hardness as a cemented carbide.

[6] The second hard phase includes at least Cr as one or more types of metal elements selected from Group 4 elements, Group 5 elements, and Group 6 elements of the Periodic Table excluding tungsten. The cemented carbide thus defined is further enhanced in strength and can suppress cracking caused by thermal shock or mechanical impact.

[7] Relative to any surface or any cross section of the cemented carbide
the first and second hard phases have area ratios, respectively, of 70% to 95% in total and
the binder phase including Co has an area ratio of 5% to 30%, and
a sum of the area ratio of the first hard phase, the area ratio of the second hard phase and the area ratio of the binder phase including Co is 100%. The cemented carbide thus defined ensures that a cutting tool manufactured with the cemented carbide used as a material can balance hardness and toughness as a cutting tool.

[8] A cutting tool according to one aspect of the present disclosure includes a cemented carbide according to any one of items [1] to [7] as a substrate. The cutting tool that comprises excellently tough cemented carbide as a substrate allows processing to be done under a severer cutting condition or can have an increased lifetime against the condition, and the like.

[9] The cutting tool further comprises a hard coating which coats at least a portion of a surface of the substrate. The cutting tool comprising a substrate having a surface coated with a hard coating can be enhanced in abrasion resistance and the like. The cutting tool thus allows processing to be done under a further severer cutting condition or can have an increased lifetime against the condition, and the like.

Detailed Description of Embodiments

Hereinafter, an embodiment of the present invention will specifically be described. Note, however, that the present invention is not limited to these examples. In the present specification, an expression in the form of "A-B" means a range's upper and lower limits (that is, A or more and B or less), and when A is not accompanied by any unit and B is alone accompanied by a unit, A has the same unit as B. Further, in the present specification, when a compound is represented by a composition formula (or chemical formula) with its constituent element ratio unspecified, such as "TiC," the composition formula (or chemical formula) shall encompass any conventionally known composition (or element ratio). The composition formula (or chemical formula) shall include not only a stoichiometric composition but also a nonstoichiometric composition. For example, the compositional formula (or chemical formula) of "TiC" includes not only a stoichiometric composition of "$Ti_1C_1$," but also a non-stoichiometric composition for example of "$Ti_1C_{0.8}$". Compounds other than "TiC" are also similarly described.

[Cemented Carbide]

A cemented carbide of the present embodiment is
a cemented carbide comprising a first hard phase composed of tungsten carbide particles and a binder phase including Co,
the cemented carbide having a ratio Nt/Na of 0.9 or more, where, in any surface or any cross section of the cemented carbide,
a region in which there is a distance X of 5 nm or less between surfaces respectively of tungsten carbide particles adjacent to each other, the surfaces facing each other along a length of 100 nm or more, is referred to as a WC/WC interface, and
Na represents a total number of WC/WC interfaces and Nt represents a number of WC/WC interfaces having distance X of 1 nm or more and 5 nm or less and having therein an atomic percentage of Co higher than an average value of atomic percentages of Co in the tungsten carbide particles.

<<First Hard Phase>>

The first hard phase is composed of tungsten carbide (hereinafter also referred to as "WC") particles. Note that tungsten carbide as referred to herein includes not only "pure WC (including WC which does not contain any impurity element at all and WC which contains an impurity element below a limit for detection)" but also "WC containing another impurity element therein intentionally or inevitably insofar as it does not impair an effect of the present invention." The tungsten carbide contains impurity in a percentage (a total percentage when the impurity is constituted of two or more elements) of 5 mass % or less with respect to a total amount of the tungsten carbide and the impurity.

(Average Particle Diameter of Tungsten Carbide Particles)

The tungsten carbide particles in the cemented carbide have an average particle diameter preferably of 0.5 µm or more and 5.0 µm or less, more preferably 1.0 µm or more and 4.8 µm or less. The tungsten carbide particles in the cemented carbide having an average particle diameter of 0.5 µm or more can be large in toughness and suppress chipping or breaking caused by mechanical impact and thermal shock. Furthermore, it can enhance crack propagation resistance, and thus suppress propagation of cracking, and hence chipping or breaking. Furthermore, having an average particle diameter of 5.0 µm or less enables large hardness and suppresses deformation in cutting, and can thus suppress abrasion or breaking.

The average particle diameter of the tungsten carbide particles in the cemented carbide is determined by processing any surface or any cross section of the cemented carbide to be a mirror finished surface, obtaining an image of the mirror finished surface with a microscope, and analyzing the obtained image. Specifically, from the obtained image, individual tungsten carbide particles' particle diameters (Heywood diameter: an equivalent diameter of a circle that has the same area as a projected area) are calculated and their average value is determined as an average particle diameter of the tungsten carbide particles. At least 100 or more tungsten carbide particles are measured and more preferably, 200 or more tungsten carbide particles are measured. Further, preferably, the same cemented carbide is subjected to the above image analysis in a plurality of fields of view to obtain particle diameters and their average value is determined as an average particle diameter of the tungsten carbide particles. The image analysis is done preferably in five or more fields of view, more preferably seven or more fields of view, still more preferably 10 or more fields of view, further still more preferably 20 or more fields of view. One field of view may be, for example, a square of 20 µm in length×20 µm in width.

Mirror surface processing for example includes polishing with diamond paste, using focused ion beam (FIB) equipment, using a cross section polisher (CP equipment), combining them together, or the like. When imaging the processed surface with a metallurgical microscope, it is preferable to etch the processed surface with Murakami's reagent. The microscope includes a metallurgical microscope, a scanning electron microscope (SEM), and the like. An image obtained through the microscope is taken into a computer and analyzed using image analysis software to obtain various types of information such as an average particle diameter. In doing so, the tungsten carbide particles constituting the first hard phase, the binder phase including Co as will be described later, and a second hard phase described later, can each be identified from the above obtained image by light and shade of color. As the image analysis software, an image analysis type particle size distribution analysis software ("Mac-View" manufactured by Mauntec Co., Ltd.) can be suitably used.

(Area Ratio of First Hard Phase)

In the cemented carbide according to the present embodiment, it is preferable that the first hard phase have an area ratio of 70% to 95% to any surface or any cross section of the cemented carbide. In that case, a sum of the area ratio of the first hard phase and the area ratio of the binder phase including Co described below is 100%. The area ratio of the first hard phase is obtained, for example, by taking an image of any processed surface of the cemented carbide with a microscope and analyzing the obtained image, similarly as done when obtaining an average particle diameter of the tungsten carbide particles, as has been described above. That is, it can be calculated by determining tungsten carbide particles in a predetermined field of view, performing image-processing to calculate a sum of the areas of the determined tungsten carbide particles, and dividing it by the area of the field of view. Furthermore, it is preferable that the same cemented carbide undergo the above image analysis in a plurality of fields of view (for example, five or more fields of view) and an average value thereof be determined as the area ratio of the first hard phase. For the above image processing, an image analysis type particle size distribution analysis software ("Mac-View" manufactured by Mauntec Co., Ltd.) can be suitably used. The "predetermined field of view" may be the same as the field of view used in obtaining the average particle diameter of tungsten carbide particles, as has been described above.

<<Binder Phase>>

The binder phase is a phase binding: tungsten carbide particles constituting the first hard phase; compounds constituting the second hard phase which will be described later; or tungsten carbide particles constituting the first hard phase and a compound constituting the second hard phase. The binder phase includes cobalt (Co).

Note that herein "the binder phase includes cobalt (Co)" means that the binder phase contains Co as a major component. "The binder phase contains Co as a major component" means that the composition of the binder phase including Co, that is, a mass ratio 'Co included in "a binder phase including Co"' to 'the binder phase including Co' is 50 mass % or more and 100 mass % or less.

The mass ratio of 'Co included in "a binder phase including Co"' to the 'binder phase including Co' can be measured via SEM-EDS.

(Area Ratio of Binder Phase Including Co)

In the cemented carbide according to the present embodiment, it is preferable that the binder phase including Co have an area ratio of 5% to 30% to any surface or any cross section of the cemented carbide. Setting the Co-including binder phase's area ratio within the above-indicated range and increasing the ratio of the number of regions where distance X between surfaces of adjacent tungsten carbide particles is 5 nm or less (i.e., WC/WC interfaces), can increase the volume ratio of the first hard phase (a phase larger in hardness than the binder phase) occupying the cemented carbide to increase the entire cemented carbide's hardness and increase a portion having a large binding strength between tungsten carbide particles of the first hard phase to prevent cracking from starting from an interface between the tungsten carbide particles. The cemented carbide can thus further be excellent in toughness.

Note that as well as the area ratio of the first hard phase, the area ratio of the binder phase including Co can be calculated by determining any "binder phase including Co" in a predetermined field of view, calculating a sum in area of such "binder phase including Co", and dividing it by the area of the field of view. Furthermore, it is preferable that the same cemented carbide undergo the above image analysis in a plurality of fields of view (for example, five or more fields of view) and an average value thereof be determined as the area ratio of the binder phase including Co.

Examples of other elements constituting the binder phase include nickel (Ni), iron (Fe), aluminum (Al), and the like. The above other elements may be used each alone or in combination of two or more thereof. Furthermore, the binder phase may include constituent elements of the first hard phase, i.e., tungsten, carbon, or other inevitable constituent elements. The other elements constituting the binder phase including Co are permitted to be included in the binder phase within a range which does not impair a function serving as a binder phase including Co (i.e., a function binding: tungsten carbide particles constituting the first hard phase; compounds constituting the second hard phase; or tungsten carbide particles constituting the first hard phase and a compound constituting the second hard phase).

Furthermore, the binder phase may include at least one of chromium (Cr) and vanadium (V). These elements can be included as derived from impurity inevitable in producing tungsten carbide particles, as has been described above, or a particle growth inhibitor or the like used in the process for producing the cemented carbide, as required. When these elements are present in the binder phase, it is believed that they are present in the binder phase in the form of a solid solution.

<<WC/WC Interface>>

The "WC/WC interface" according to the present embodiment refers to a region in any surface or any cross section of the cemented carbide in which there is distance X of 5 nm or less between surfaces respectively of tungsten carbide particles adjacent to each other, the surfaces facing each other along length L of 100 nm or more. Hereinafter, it will be described in detail with reference to FIG. 1.

FIG. 1 is a schematic diagram showing a structure of a cemented carbide according to the present embodiment. The schematic diagram represents any surface or any cross section of the cemented carbide. A tungsten carbide particle 10a is positionally adjacent to tungsten carbide particles 10b, 10c and 10d such that the former has a surface facing those of the latter along lengths Lab, Lac and Lad, respectively, (hereinafter also collectively referred to as "length L"). "Length L" means a length along which the adjacent tungsten carbide particles in any surface or any cross section of the cemented carbide have their surfaces facing each other. In FIG. 1, lengths Lab, Lac and Lad are 100 nm or more. While length L has an upper limit which is not particularly limited, it is for example 5.0 µm or less. Further, the tungsten carbide particles have surfaces with distances Xab, Xac and Xad (hereinafter also collectively referred to as a "distance X") of 5 nm or less therebetween. While distance X has a lower limit which is not particularly limited, it may for example be 0 nm or more. Note that throughout the WC/WC interface, tungsten carbide particles have their mutually facing surfaces in parallel. Therefore, distance X is substantially uniform throughout the WC/WC interface. Where the "WC/WC interface" in the present embodiment is defined as described above, in FIG. 1 tungsten carbide particle 10a faces tungsten carbide particles 10b, 10c and 10d in regions 20ab, 20ac and 20ad, respectively, which are all WC/WC interfaces, respectively (hereinafter also referred to as "WC/WC interface 20ab" and the like), and a total number Na thereof is 3. Distance X between surfaces of tungsten carbide particles 10b and 10c is an example of exceeding 5 nm, and it is not counted as a WC/WC interface.

Each of WC/WC interfaces 20ab, 20ac and 20ad in FIG. 1 will be further described. WC/WC interfaces 20ab and 20ac are WC/WC interfaces which have distances Xab and Xac of 1 nm or more and 5 nm or less and have therein an atomic percentage of Co higher than an average value of atomic percentages of Co in tungsten carbide particles. That is, in FIG. 1 there are two WC/WC interfaces having distance X of 1 nm or more and 5 nm or less and having therein an atomic percentage of Co higher than an average value of atomic percentages of Co in tungsten carbide particles (i.e., Nt=2). In such a WC/WC interface the binder phase and hence Co included in the binder phase are present, and adhesive strength of tungsten carbide particles is increased through Co. Further, the WC/WC interface in which the binder phase and hence Co included in the binder phase are present enhances the cemented carbide in toughness.

In contrast, WC/WC interface 20ad is an example of a WC/WC interface having distance Xad less than 1 nm. In such a WC/WC interface, the binder phase and hence the Co included in the binder phase are absent, or if they are present, there is a high probability that they are present in an extremely small amount. Therefore, the adhesion strength between the tungsten carbide particles in WC/WC interface 20ad tends to be smaller than that between the tungsten carbide particles in WC/WC interface 20ab and that between the tungsten carbide particles in WC/WC interface 20ac. Furthermore, if there are many WC/WC interfaces having distance X less than 1 nm, the cemented carbide tends to be decreased in toughness.

(Ratio Nt/Na)

In the present embodiment, from the viewpoint of improving the cemented carbide in toughness, it is preferable that a ratio of number Nt of WC/WC interfaces having distance X of 1 nm or more and 5 nm or less and having therein an atomic percentage of Co higher than an average value of atomic percentages of Co in tungsten carbide particles to total number Na of WC/WC interfaces (i.e., Nt/Na) be 0.9 or more, more preferably 0.94 or more. While ratio Nt/Na has an upper limit which is not particularly limited, it may for example be 1.0 or less. Herein, a "WC/WC interface having therein an atomic percentage of Co higher than an average value of atomic percentages of Co in tungsten carbide particles" indicates that the WC/WC interface has therein an atomic percentage of Co exceeding the average value of atomic percentages of Co in tungsten carbide particles. In this case, more preferably the WC/WC interface has therein an atomic percentage of Co departing from the range of the average value of atomic percentages of Co in tungsten carbide particles±1 at % (that is, a percentage exceeding the average value of the atomic percentages of Co+1 at %, and the same shall apply hereinafter), more preferably a percentage departing from the range of the average value of the atomic percentages of Co±2 at %, still more preferably a percentage departing from the range of the average value of the atomic percentages of Co±3 at %. Note that Na and Nt indicated above with reference to FIG. 1 by way of example are 3 and 2, respectively, and accordingly, ratio Nt/Na is calculated as ⅔=0.67.

(Counting WC/WC Interfaces)

WC/WC interfaces are counted in a method for example as follows:

Initially, any surface or any cross section of the cemented carbide is observed with a transmission electron microscope (TEM) at a low magnification. Herein, the cross section can be formed by cutting the cemented carbide at any location and subjecting the cut surface to the mirror surface processing as has been described above. In the observation at a low magnification, a WC/WC interface is observed with tungsten carbide particles in contact with each other. Therefore, a region in which tungsten carbide particles are observed to be in contact with each other is counted as a candidate region for a WC/WC interface, and the microscope has a magnification set such that a field of view (in the form of a square) includes at least 100 such candidate regions. Such a magnification is, for example, 4000 times. Further, a single field of view is, for example, a square of 20 µm in length×20 µm in width. Observation of WC/WC interfaces in a single field of view and a line analysis described later are conducted in at least 50 locations, preferably 100 locations. This is done on a surface of the cemented carbide (a surface of the cemented carbide excluding a hard coating, which will be described later, when the cemented carbide comprises the hard coating) and in a cross section inside the cemented carbide (at a center of gravity thereof), each in at least 2 or more fields of view, preferably 5 or more fields of view, more preferably 10 or more fields of view. A measurement method described later is employed to count a WC/WC interface that has distance X of 5 nm or less.

(Method for Measuring Distance X in WC/WC Interface)

Distance X is measured for example in the following method.

Figure 2A:
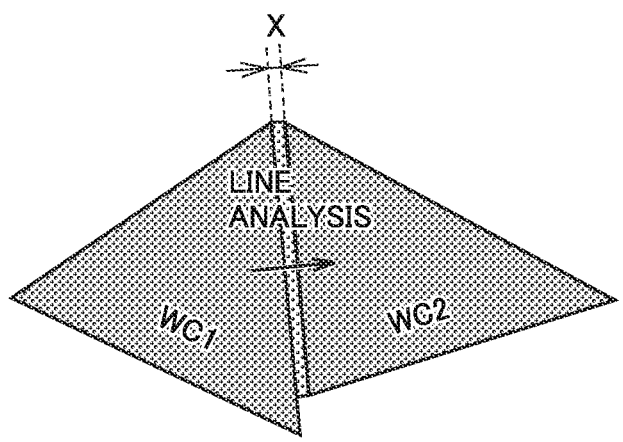
FIG. 2A is a schematic diagram for illustrating a method of a line analysis at a WC/WC interface.
Figure 2B:
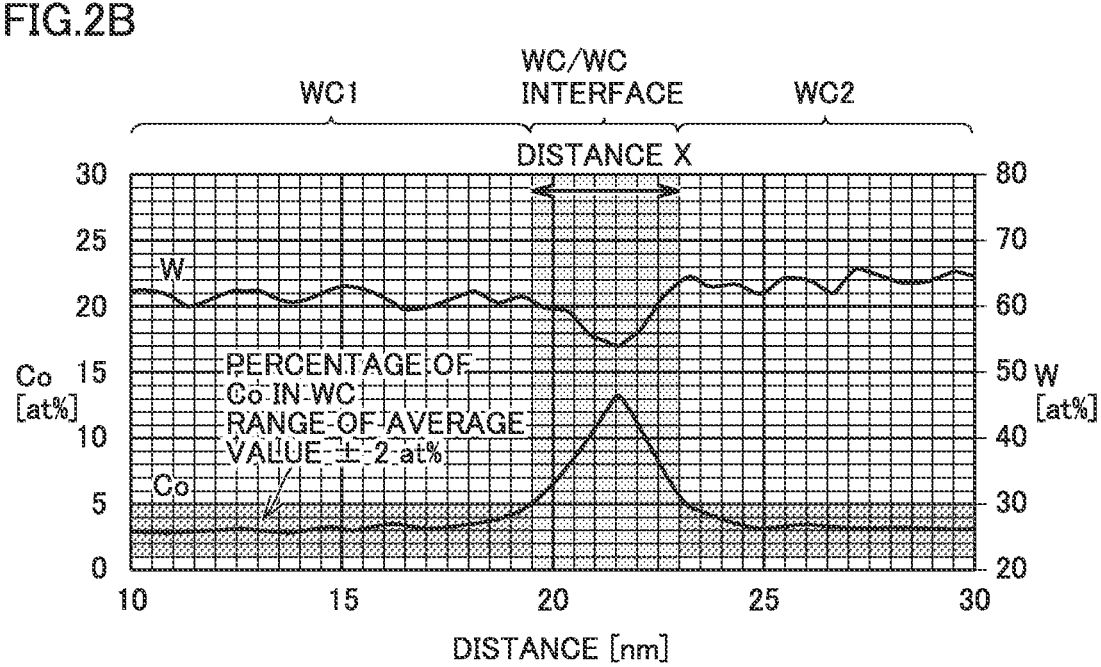
FIG. 2B is an example of a graph showing a result of the line analysis at the WC/WC interface.

Initially, one candidate region for a WC/WC interface is noted and observed at a high magnification (for example of 2,000,000 times). Subsequently, a line analysis is conducted by employing energy dispersive spectroscopy (EDS) in a direction passing through centers of planes in which tungsten carbide particles (a first tungsten carbide particle (WC1) and a second tungsten carbide particle (WC2)) face each other and being also perpendicular to the planes (FIG. 2A). Note that the distance between the planes in which tungsten carbide particles face each other is generally uniform at any location on the planes, and accordingly, the line analysis may be conducted in a direction passing through any points other than the centers of the planes and being also perpendicular to the planes. FIG. 2B is an example of a graph showing a result of the line analysis at a WC/WC interface. The axis of abscissa represents a distance (in nm) from an origin set for the sake of convenience in conducting the line analysis. The rightwardly and leftwardly extending axis of ordinate represents quantitative values of atomic percentages (at %) of tungsten (W) (an axis of ordinate on a right side) and Co (an axis of ordinate on a left side), respectively. Based on this graph, a region having a low atomic percentage of Co is determined as a region of a tungsten carbide particle and a region having a high atomic percentage of Co is determined as a region of a binder phase including Co, and distance X between surfaces of adjacent tungsten carbide particles is determined. For example, referring to FIG. 2B, the range of the average value of atomic percentages of Co in tungsten carbide particles (WC1 and WC2)±2 at % is determined as the regions of tungsten carbide particles (the region of the first tungsten carbide particle and the region of the second tungsten carbide particle), and a range departing from the average value±2 at % (that is, a range exceeding the average value+2 at %) is determined as a region in which the binder phase including Co is present. Then, a distance from a boundary surface between the region of the first tungsten carbide particle and the region where the binder phase is present to a boundary surface between the region of the second tungsten carbide particle and the region where the binder phase is present is determined as distance X between surfaces of adjacent tungsten carbide particles. A method of calculating the average value of atomic percentages of Co in tungsten carbide particles will be described later. In the case of the measurement result shown in FIG. 2B, distance X is calculated to be 3.5 nm, and it can be determined that a region between the surfaces of adjacent tungsten carbide particles is a WC/WC interface. The same method is employed to also observe candidate regions for other WC/WC interfaces and subject them to the line analysis to measure distance X between surfaces of adjacent tungsten carbide particles and an atomic percentage of Co and count Na and Nt. Finally, ratio Nt/Na is calculated based on Na and Nt counted. In this manner, a parameter obtained based on the observation, the line analysis and the like in a plurality of fields of view (for example, five or more fields of view) will hereinafter be handled as a parameter reflecting the entirety of any cross section or any surface as set forth above.

(Method for Calculating an Average Value of Atomic Percentages of Co in Tungsten Carbide Particles)

In the present embodiment an "average value of atomic percentages of Co in tungsten carbide particles" means an average value of an average value of atomic percentages of Co in a first tungsten carbide particle having a surface constituting a WC/WC interface or a candidate region therefor (hereinafter referred to as a "WC/WC interface or the like") and an average value of atomic percentages of Co in a second tungsten carbide particle having a surface constituting the WC/WC interface or the like.

The average value of the atomic percentages of Co in each of the first and second tungsten carbide particles is calculated using a measurement result of the above line analysis (e.g., the result shown in FIG. 2B). That is, initially, a point which is located in a region inside the first tungsten carbide particle (WC1) and is distant by a predetermined distance (for example of 50 nm) from a location exhibiting a peak value of an atomic percentage of Co at a WC/WC interface or the like serves as a reference point, and a region located in a direction further away from the reference point is determined. Subsequently, in that determined region at any three points atomic percentages of Co are sampled, and an average value thereof obtained at the three points serves as an average value of atomic percentages of Co in the first tungsten carbide particle. When sampling atomic percentages of Co in the region at any three points, a point that seems to be an abnormal value at first glance is not selected.

The same procedure is employed to calculate an average value of atomic percentages of Co in the second tungsten carbide particle (WC2). Finally, an average value of the average value of the atomic percentages of Co in the first tungsten carbide particle and the average value of the atomic percentages of Co in the second tungsten carbide particle is calculated. The same procedure is also applied for other WC/WC interfaces and the like to obtain an "average value of atomic percentages of Co in tungsten carbide particles."

<<Second Hard Phase>>

The cemented carbide according to the present embodiment may further comprise a second hard phase having a composition different from that of the first hard phase. The second hard phase is preferably composed of a compound including "a plurality of types of metal elements including tungsten" and "one or more types of elements selected from C, N, O and B." Specifically, it includes being composed of a compound including "tungsten (W)," "one or more types of metal elements selected from Group 4 elements, Group 5 elements and Group 6 elements of the Periodic Table excluding tungsten," and "one or more types of elements selected from C, N, O and B" (a composite compound). Examples of Group 4 elements of the Periodic Table include titanium (Ti), zirconium (Zr), hafnium (Hf), and the like. Examples of Group 5 elements of the Periodic Table include vanadium (V), niobium (Nb), tantalum (Ta), and the like. Examples of Group 6 elements of the Periodic Table include chromium (Cr), molybdenum (Mo), and the like. The compound is mainly carbides, nitrides, carbonitrides, oxides, borides and the like of a plurality of types of metal elements including tungsten.

In the second hard phase, one or more types of metal elements selected from Group 4 elements, Group 5 elements and Group 6 elements of the Periodic Table excluding tungsten preferably have a mass ratio of 20 mass % or more and less than 100 mass % relative to a total amount of tungsten and one or more types of metal elements selected from Group 4 elements, Group 5 elements and Group 6 elements of the Periodic Table excluding tungsten.

The second hard phase is a compound phase or a solid solution phase which is composed of one or more types of such compounds as described above. Herein, "a compound phase or a solid solution phase" means that a compound constituting such a phase may form a solid solution or may exist as an individual compound rather than forming a solid solution.

Specifically, the second hard phase includes (W, Ti)C, (W, Ti)N(W, Ti)(C, N), (W, Ti, Nb)C, (W, Ti, Nb)N, (W, Ti, Nb)(C, N), (W, Cr)C, (W, Cr)N, (W, Cr)(C, N), (W, Ti, Ta)C, (W, Ti, Ta)N, (W, Ti, Ta)(C, N), (W, Nb, Ta)C, (W, Nb, Ta)N, (W, Nb, Ta)(C, N), (W, Zr)C, (W, Zr)N, (W, Zr)(C, N), and the like. Herein, for example, the expression "(W, Ti)C" means that it is a double carbide including W and Ti, a solid solution of WC and TiC, or both, and its composition (or element ratio) shall include any conventionally known composition. The composition shall have a formula including not only a stoichiometric composition but also a nonstoichiometric composition. For example, when the above-mentioned "(W, Ti)C" includes a double carbide including W and Ti, the double carbide has a composition formula also including a non-stoichiometric composition such as "$W_{0.7}Ti_{0.3}C_{1.2}$." This also applies to expressions other than "(W, Ti)C." In another aspect of the present embodiment, the second hard phase preferably includes at least Cr as one or more types of metal elements selected from Group 4 elements, Group 5 elements, and Group 6 elements of the Periodic Table excluding tungsten.

When the cemented carbide further comprises the second hard phase, the area ratio of the first hard phase is set as that of the first hard phase (tungsten carbide particles) and the second hard phase together. That is, when the cemented carbide further comprises the second hard phase, a sum of the area ratio of the first hard phase and the area ratio of the second hard phase relative to any surface or any cross section of the cemented carbide is preferably 70% to 95%. In that case, a sum of the area ratio of the first hard phase, the area ratio of the second hard phase and the area ratio of the binder phase including Co is 100%. As well as the area ratio of the first hard phase, the area ratio of the second hard phase can be calculated by determining any "second hard phase" in a predetermined field of view, calculating a sum in area of such "second hard phase," and dividing it by the area of the field of view. Furthermore, it is preferable that the same cemented carbide undergo the above image analysis in a plurality of fields of view (for example, five or more fields of view) and an average value thereof be determined as the area ratio of the second hard phase.

The second hard phase preferably has an area ratio of 5% or more to 10% or less to any surface or any cross section of the cemented carbide. By setting the area ratio of the second hard phase within this range, the cemented carbide can suppress cracking caused by thermal shock or mechanical impact and also enhance resistance to oxidation and anti-reactivity against a workpiece while maintaining hardness as a cemented carbide. When the second hard phase has an area ratio larger than the upper limit value, the cemented carbide is reduced in strength and reduced in toughness.

[Method for Manufacturing Cemented Carbide]

Typically, the cemented carbide of the present embodiment can be manufactured through a process of a powdery raw material preparation step→a mixing step→a forming step→a sintering step→a cooling step. Each step will be described below.

<<Preparation Step>>

The preparation step is the step of preparing all powdery raw materials for materials constituting the cemented carbide. As the powdery raw materials, tungsten carbide particles to be the first hard phase and Co particles to be the binder phase are included as essential powdery raw materials. Furthermore, a powdery constituent for a compound to serve as the second hard phase, a particle growth inhibitor, and the like may be prepared if necessary.

(Tungsten Carbide Particles)

While tungsten carbide particles as a raw material are not particularly limited, they preferably include tungsten carbide particles carbonized at a temperature higher than normal (hereinafter also referred to as "high temperature carbonized WC particles"). High temperature carbonized WC particles have a smaller number of particle boundaries as a raw material than tungsten carbide particles carbonized at normal temperature. A cemented carbide produced by sintering such high temperature carbonized WC particles and Co particles which are to be the binder phase together has a reduced ratio of WC/WC interfaces at which distance X between surfaces of adjacent tungsten carbide particles is less than 1 nm. Accordingly, the cemented carbide has an increased ratio of WC/WC interfaces into which Co enters, and the cemented carbide is further enhanced in toughness.

A carbonization process at high temperature (hereinafter also referred to as a "high-temperature carbonization process") is typically performed to carbonize tungsten at 1900° C. to 2150° C. for 2 hours to 8 hours. After the high-temperature carbonization process, it is preferable to cool the carbonized tungsten from the carbonization temperature (1900° C. to 2150° C.) at a rate of 2° C./min to 8° C./min to 1200° C. to 1500° C.

The above high temperature carbonized WC particles may be commercially available WC particles, and for example, include a "uniform tungsten carbide powder" series produced by Allied Material Corp.

The tungsten carbide particles as a raw material preferably have an average particle diameter of 1.0 μm or more 20 μm or less, more preferably 2.4 μm or more and 16 μm or less. When the tungsten carbide particles as a raw material that have an average particle diameter of 1.0 μm or more are used to produce a cemented carbide, the cemented carbide can have large toughness and suppress chipping or breaking caused by mechanical impact and thermal shock. Furthermore, it can enhance crack propagation resistance, and thus suppress propagation of cracking, and hence chipping or breaking. Furthermore, when the tungsten carbide particles as a raw material that have an average particle diameter of 20 μm or less are used to produce a cemented carbide, the cemented carbide can have large hardness and suppress deformation in cutting, and can thus suppress abrasion or breaking.

The tungsten carbide particles as a raw material have an average particle diameter having a value as measured using a particle size distribution measurement instrument of MicrotracBEL Corp.

(Co Particles)

As a raw material, particles of Co (hereinafter also referred to as "Co particles") are preferably fine and spherical. The Co particles have an average particle diameter preferably of 0.3 μm or more and 1 μm or less, more preferably 0.4 μm or more and 0.7 μm or less. When the Co particles as a raw material that have an average particle diameter of 1 μm or less suppress formation of an aggregate of Co when sintering a liquid phase, and promote penetration into a WC/WC interface. As a result, the resulting cemented carbide has large toughness and can suppress chipping or breaking caused by mechanical impact and thermal shock. Furthermore, it can enhance crack propagation resistance, and thus suppress propagation of cracking, and hence chipping or breaking.

The Co particles as a raw material have an average particle diameter having a value as measured using the particle size distribution measurement instrument of MicrotracBEL Corp.

(Powdery Constituent for Compound)

As the powdery constituent for a compound, the following two patterns are considered: A first pattern uses a powdery compound including individually constituent elements of a compound constituting the second hard phase or uses individual powdery constituent elements. For the first pattern, in a sintering step described later, each powdery constituent element is partially, once dissolved into the binder phase, and composited with the other powdery constituent element(s). Thereafter, they are cooled and thus deposited as a composite compound. For example, when tungsten carbide particles and powdery TiC are used as powdery raw materials, and sintered, the WC and a portion of TiC may be dissolved and composited together, and deposited as a composite compound of (W, Ti)C. This (W, Ti)C is the second hard phase (or a composite compound phase). Such a powdery raw material also includes $Cr_3C_2$, NbC, ZrC, TiN, TaC, and the like.

A second pattern uses the above composite compound in the form of powder as a powdery raw material (a powdery composite compound). For the second pattern, it is also present while maintaining the form of the powdery raw material (that is, the form of the composite compound) in a sintering process described later. For example, when powdery (W, Ti)C is used as a powdery raw material, and included in an excessive amount, in particular, it may be present while maintaining its form even after it is sintered. This (W, Ti)C is the second hard phase (or a composite compound phase).

One of the conditions to disperse uniformly in the cemented carbide a second hard phase having a uniform particle size includes using a powdery constituent for a compound which is composed of fine particles uniform in particle size. This allows a sintering step, which will be described hereinafter, to be performed to make the second hard phase fine and disperse the second hard phase. The powdery constituent for the compound has an average particle diameter for example within a range of 0.1 μm or more and less than 1.5 μm. The smaller the average particle diameter of the powdery constituent for the compound that is used as a raw material is, the smaller the average particle diameter of the second hard phase in a finally obtained cemented carbide is. The larger the average particle diameter of the powdery constituent for the compound that is used as a raw material is, the larger the average particle diameter of the second hard phase in a finally obtained cemented carbide is. The average particle diameter of the powdery constituent for the compound that is used as a raw material further includes 0.2 μm or more and 1.4 μm or less, 0.3 μm or more and 1.3 μm or less, in particular. By pulverizing/classifying a commercially available product, a powdery constituent for a compound which is powder of fine particles uniform in particle size is obtained.

<<Mixing Step>>

The mixing step is the step of mixing each powdery raw material prepared in the preparation step. By the mixing step, a powdery mixture of powdery raw materials mixed together is obtained. Furthermore, a mass ratio of raw materials (for example, tungsten carbide particles, Co particles, etc.) when they are mixed is a ratio corresponding to the above area ratio. A known apparatus can be used for the mixing step. For example, an attritor, a rolling ball mill, a bead mill or the like can be used. One of the conditions allowing the cemented carbide to have an increased ratio of a number (Nt) of WC/WC interfaces having distance X of 1 nm or more and 5 nm or less and having therein an atomic percentage of Co higher than an average value of atomic percentages of Co in tungsten carbide particles to a total number (Na) of WC/WC interfaces, includes mixing raw materials under a condition in which tungsten carbide particles including a particle boundary have a low ratio and the raw materials are mixed together uniformly without causing aggregation. One such exemplary mixing condition with an attritor used includes a rotation speed of 300 rpm or more and 500 rpm or less and a mixing time of 30 minutes or more and less than 300 minutes. The rotation speed is preferably high-speed rotation, more preferably 350 rpm or more, further preferably 450 rpm or more. While the rotation speed has an upper limit which is not particularly limited, it is for example 500 rpm or less, 400 rpm or less, or 350 rpm or less. The mixing time is preferably shorter, more preferably 180 minutes or less, and still more preferably 120 minutes or less. Mixing by using an attritor may be wet mixing or dry mixing. Furthermore, mixing may be done in a solvent such as water, ethanol, acetone, isopropyl alcohol or the like. Mixing may be done with a binder such as polyethylene glycol, paraffin wax or the like.

After the mixing step, the powdery mixture may be granulated as needed. The powdery mixture granulated is easily introduced into a die or a mold in a forming step described later. The granulation can be done in a known granulation method and for example a commercially available granulator such as a spray dryer can be used.

<<Molding Step>>

The forming step is the step of forming the powdery mixture that is obtained in the mixing step into a predetermined shape to obtain a formed body. The forming step may be done in a common forming method under a common forming condition and is not particularly limited. The predetermined shape for example includes a shape of a cutting tool (for example, a shape of a removable cutting tip).

<<Sintering Step>>

The sintering step is the step of sintering the formed body that is obtained in the forming step to obtain a sintered material. In the sintering step, it is preferable to perform sintering for a sufficient period of time after a liquid phase of the binder phase including Co has appeared. Sintering in this way allows the liquid phase of the binder phase including Co to sufficiently penetrate the WC/WC interface and facilitates particulate growth of tungsten carbide particles. This reinforces necking of the tungsten carbide particles. Specifically, the sintering temperature is preferably 1400° C. or higher and 1450° C. or lower. The sintering time is preferably 2 hours or more and 5 hours or less, and more preferably 2 hours or more and 4 hours or less. A rate of raising temperature to the sintering temperature is preferably 1° C./min to 3° C./min from 1250° C. to 1450° C. for example. While a rate of raising temperature after room temperature to 1250° C. is not particularly limited, it is for example 1° C./min to 30° C./min.

While the sintering may be done in an atmosphere which is not particularly limited, it is for example an $N_2$ gas atmosphere or an inert gas atmosphere such as Ar. Furthermore, the sintering is done e.g., with a degree of vacuum (or pressure) preferably of 10 kPa or less, more preferably 5 kPa or less, further preferably 3 kPa or less.

In the sintering step, a sintering HIP may be performed to allow pressure to be applied when sintering. The HIP is done for example in an $N_2$ gas atmosphere or an inert gas atmosphere such as Ar at 1300° C. or higher and 1350° C. or lower with a pressure of 5 MPa or more and 2001 MPa or less applied.

<<Cooling Step>>

The cooling step is the step of cooling the sintered material. One of the conditions to promote penetration of the liquid phase of the binder phase including Co into the WC/WC interface includes performing the cooling step to gradually cool the sintered material from the sintering temperature to a temperature allowing solidification of the liquid phase of the binder phase including Co. Specifically, it is allowed to stand to cool from the sintering temperature (1400° C. or higher and 1450° C. or lower) to 1200° C. or higher and 1250° C. or lower (at a cooling rate of about 2° C./min). Being allowed to stand to cool from the sintering temperature facilitates the liquid phase of the binder phase including Co to penetrate into the WC/WC interface. After the sintered material is cooled to 1200° C. or higher and 1250° C. or lower, it may be cooled with pressure applied thereto.

While the cooling step may be done in an atmosphere which is not particularly limited, it is done for example in an $N_2$ gas atmosphere or an inert gas atmosphere such as Ar. Pressure applied in the cooling step is not particularly limited, and it may be compression or decompression. Pressure for compression is for example set to 400 kPa or more and 500 kPa or less. Furthermore, the cooling step is done with a degree of vacuum (or pressure) for example of 100 kPa or less, preferably 10 kPa or more and 50 kPa or less.

<<Cutting Tools, Wear-Resistant Tools and Grinding Tools>>

The cemented carbide of the present embodiment has excellent toughness, as has been described above, and can be used as a substrate for cutting tools, wear-resistant tools and grinding tools. That is, a cutting tool of the present embodiment includes the above cemented carbide as a substrate. A wear-resistant tool and a grinding tool of the present embodiment include the above cemented carbide as a substrate.

The cemented carbide according to the present embodiment is widely applicable to conventionally known cutting tools, wear-resistant tools and grinding tools. Such tools can be exemplified by the following tools. The cutting tool can be exemplified by a cutting bite, a drill, an end mill, a removable cutting tip for milling, a removable cutting tip for turning, a metal saw, a gear cutting tool, a reamer, a tap and the like. The wear-resistant tool can be exemplified by a die, a scriber, a scribing wheel, a dresser, and the like. Further, the grinding tool can be exemplified by a grinding wheel or the like.

The cemented carbide of the present embodiment may also configure these tools entirely or partially. Herein, to "configure . . . partially" means that, for example for a cutting tool, the cemented carbide of the present embodiment is brazed to any substrate at a predetermined position to serve as a cutting edge.

<<Hard Coating>>

The cutting tool according to the present embodiment may further comprise a hard coating which coats at least a portion of a surface of the substrate. The wear-resistant and grinding tools according to the present embodiment may further comprise a hard coating which coats at least a portion of a surface of the substrate. The hard coating has a composition which includes a compound of: one or more types of elements selected from a metal element of Group 4 of the Periodic Table, a metal element of Group 5 of the Periodic Table, a metal element of Group 6 of the Periodic Table, aluminum (Al) and silicon (Si); and one or more types of elements selected from the group consisting of nitrogen (N), oxygen (O), carbon (C) and boron (B). For example, Ti(C, N), $Al_2O_3$, (Ti, Al)N, TiN, TiC, (Al, Cr)N, etc. are referred to. In addition, cubic boron nitride (cBN), diamond-like carbon and the like are also suitable as a composition of the hard coating. Such a hard coating can be formed by a gas phase method such as chemical vapor deposition (CVD) and physical vapor deposition (PVD). CVDing the hard coating helps the hard coating to have excellent adhesion to the substrate. The hard coating is for example thermally CVDed. PVDing the hard coating imparts compressive residual stress and thus helps to enhance the hard coating in toughness.

The hard coating in the cutting tool according to the present embodiment preferably coats the substrate at a portion to be a cutting edge, and a vicinity thereof, and may coat the substrate entirely. The hard coating may be a single layer or a multilayer. The hard coating has a thickness of 1 µm or more and 20 µm or less, furthermore, 1.5 µm or more and 15 µm or less, for example.

EXAMPLES

Test Examples

Test Example 1

In Test Example 1, a raw material having a composition indicated in the following Table 1 by composition No. A-2a was used to produce a variety of types of cemented carbides under different conditions. After that, cutting tools (removable cutting tips) comprising substrates formed of the obtained cemented carbides were manufactured and assessed.

<<Preparing Samples>>

As a powdery raw material, powder having a composition and an average particle diameter indicated in Table 1 by composition No. A-2a was prepared (the preparation step). In Table 1, tungsten carbide particles as the first hard phase and Co particles as the binder phase at columns "type" indicate alphabetical letters, which indicate the following samples:

Types of Tungsten Carbide Particles a: tungsten carbide particles carbonized at a high temperature (produced by Allied Material Corp., trade name: uniform tungsten carbide powder WC60S)

b: tungsten carbide particles carbonized at a temperature as conventional (produced by Allied Material Corp., trade name: standard tungsten carbide powder WC60)

Types of Co Particles c: coarse particle product produced by Freeport Cobalt (trade name: "R-Series Cobalt Powder" having an average particle diameter of 3 µm)

d: a fine particle series produced by Freeport Cobalt (trade name: "S-Series Cobalt Powder" S80 having an average particle diameter of 0.7 µm)

Note that, tungsten carbide particles at the "type" column indicate parenthesized numerals, which indicate their average particle diameters (in µm). The above average particle diameters are values measured using a particle size distribution measuring instrument manufactured by MicrotracBEL Corp. Table 1 indicates "balance," which means an amount required to allow a powdery raw material as a whole to be 100% by mass.

In other words, in the raw material of composition No. A-2a, tungsten carbide (hereinafter also referred to as "WC") powder was tungsten carbide particles carbonized at high temperature (manufactured by Allied Material Corp., trade name: uniform tungsten carbide powder WC60S having an average particle diameter of 6.3 µm). As the Co particles, a fine particle series produced by Freeport Cobalt (trade name: "S-Series Cobalt Powder" S80 having an average particle diameter of 0.7 µm) was used. The powdery raw material's average particle diameters were determined using a particle size analyzer (trade name: MT 3300 EX) manufactured by MicrotracBEL Corp.

TABLE 1

| composition | WC particle | | TiC | NbC | ZrC | TiN | TaC | Co particle | |
| --- | --- | --- | --- | --- | --- | --- | --- | --- | --- |
| Nos. | wt % | type | wt % | wt % | wt % | wt % | wt % | wt % | type |
| A-1 | balance | a (6.3) | — | — | — | — | — | 5 | d |
| A-2a | balance | a (6.3) | — | — | — | — | — | 10 | d |
| A-2b | balance | b (6.4) | — | — | — | — | — | 10 | d |
| A-2c | balance | a (6.3) | — | — | — | — | — | 10 | c |
| A-2d | balance | a (2.4) | — | — | — | — | — | 10 | d |
| A-2e | balance | a (16) | — | — | — | — | — | 10 | d |
| A-3 | balance | a (6.3) | — | — | — | — | — | 15 | d |
| A-4 | balance | a (6.3) | 3.0 | — | — | — | — | 5 | d |
| A-5 | balance | a (6.3) | 3.0 | — | — | — | — | 8 | d |
| A-6 | balance | a (6.3) | 3.0 | — | — | — | — | 11 | d |
| A-7 | balance | a (6.3) | 2.0 | 1.0 | — | — | — | 11 | d |
| A-8 | balance | a (6.3) | 2.5 | — | 0.5 | — | — | 11 | d |
| A-9 | balance | a (6.3) | 2.5 | — | — | 0.5 | — | 11 | d |
| A-10 | balance | a (6.3) | 2.5 | — | — | — | 0.5 | 11 | d |

A commercially available attritor (trade name: MA01SC produced by Nippon Coke & Engineering Co., Ltd.) was used to mix each powder with a granulating binder (polyethylene glycol series produced by Tokyo Chemical Industry Co., Ltd. or paraffin wax series produced by Yamakei Sangyo) and a solvent (trade name: ethanol produced by Hayashi Pure Chemical Ind., Ltd.) to prepare a powdery mixture (the mixing step). They were mixed at rotation speeds (in rpm) for periods of time (in hours) as shown in Table 2. After the mixing, the obtained powdery mixture was spray-dried to be granulated powder.

The obtained granulated powder was press-formed to produce a formed body in the form of model no. SEET13T3AGSN-G (produced by Sumitomo Electric Hardmetal (a removable cutting tip) (the forming step).

The obtained formed body was placed in a sintering furnace and heated in a vacuum from 1250° C. to 1400° C. for a period of time indicated in Table 2 (at the "raising temperature 1250° C.→" column), and then held at 1400° C. for a period of time indicated in Table 2 (at the "keeping 1400° C." column) and thus sintered (the sintering step).

After the formed body had been sintered, it was cooled in an Ar gas atmosphere (with 500 kPa applied when allowed to stand to cool, otherwise with 400 kPa applied) from 1400° C. to 1250° C. in a method indicated in Table 2 (at the "cooling→1250° C." column).

(Calculating Area Ratio of First Hard Phase Composed of Tungsten Carbide Particles and Area Ratio of Binder Phase Including Co)

Image analysis type particle size distribution analysis software ("Mac-View" manufactured by Mauntec Co., Ltd.) was used to determine in a processed surface of each sample an area ratio of the first hard phase composed of tungsten carbide particles and an area ratio of the binder phase including Co. A result thereof is shown in Table 3.

(Calculating an Average Value of Atomic Percentages of Co in Tungsten Carbide Particles, and Distance X in WC/WC Interface)

Initially, each sample's processed surface was observed with a transmission electron microscope (TEM) (manufactured by JEOL Ltd.) at a magnification of 4000 times. A square of 20 μm in length×20 μm in width was set as one field of view. A region observed in one field of view to have adjacent tungsten carbide particles in contact with each other while having surfaces, respectively, facing each other along length L of 100 nm or more was counted as a candidate region for a WC/WC interface, and there were 358 such candidate regions. Each sample's surface and each sample's internal cross section (or cross section of its center of gravity) were each considered as the above processed surface, and such an observation as described above was conducted in 10 fields of view for each processed surface.

TABLE 2

| manufacturing condition Nos. | mixing step | | sintering step & cooling step | | |
|---|---|---|---|---|---|
| | rotation speed (rpm) | time (hour) | raising temperature 1250° C. → (min) | keeping 1400° C. (hour) | cooling → 1250° C. |
| B-1 | 200 | 10 | 50 | 2 | stand to cool |
| B-2 | 350 | 3 | 10 | 2 | stand to cool |
| B-3 | 350 | 3 | 50 | 0.5 | stand to cool |
| B-4 | 350 | 3 | 50 | 2 | stand to cool |
| B-5 | 350 | 3 | 50 | 2 | 5 min. Ar-400KPaG |
| B-6 | 350 | 3 | 50 | 4 | stand to cool |
| B-7 | 350 | 3 | 150 | 2 | stand to cool |
| B-8 | 450 | 2 | 50 | 2 | stand to cool |

<<Observing Samples>>

(Calculating Average Particle Diameter of Tungsten Carbide Particles)

Produced cemented carbide substrate sample Nos. C-1 to C-8 had their cutting edge portions cut and processed to have a mirror-finished surface and thereafter ion-milled with an argon ion beam to provide cross sections to serve as samples to be observed with a microscope.

Each observed sample's processed surface was imaged with a scanning electron microscope (SEM) (manufactured by JEOL Ltd.) at a magnification of about 2000 times to obtain a backscattered electron image. This was done for each sample in 10 fields of view outside the processed surface and 10 fields of view at the center of the processed surface.

For each sample, for each field of view, 300 or more tungsten carbide particles were analyzed using image analysis type particle size distribution analysis software ("Mac-View" manufactured by Mauntec Co., Ltd.) to determine individual particles' particle diameters (Heywood's diameter), and an average particle diameter of sintered tungsten carbide particles in a total of 10 fields of view was calculated. A result thereof is shown in Table 3.

Subsequently, one candidate region for a WC/WC interface as described above was noted and observed at a magnification of 2,000,000 times. Subsequently, the candidate region was subjected to a line analysis conducted by employing energy dispersive spectroscopy (EDS) in a direction passing through centers of planes in which tungsten carbide particles face each other and being also perpendicular to the planes. The line analysis was conducted with a TEM manufactured by JEOL Ltd. A graph was created based on a result of the line analysis obtained (for example see FIG. 2B). In the graph, the axis of abscissa represents a distance (in nm) from an origin set for the sake of convenience in conducting the line analysis for the sake of illustration. The axis of ordinate represents quantitative values of atomic percentages (at %) of tungsten (W) (an axis of ordinate on a right side) and Co (an axis of ordinate on a left side), respectively, for the sake of illustration.

From the above graph, an average value of atomic percentages of Co in tungsten carbide particles each having a surface constituting a candidate region for a WC/WC interface or the like was calculated. That is, initially, a point which was located in a region inside a first tungsten carbide particle having a surface constituting a candidate region for the WC/WC interface and was distant by 50 nm from a location exhibiting a peak value of an atomic percentage of Co in the candidate region for the WC/WC interface was set as a reference point, and a region located in a direction further away from the reference point was determined. Subsequently, in that determined region at any three points atomic percentages of Co were sampled, and an average value thereof obtained at the three points was determined as an average value of atomic percentages of Co in the first tungsten carbide particle. When sampling atomic percentages of Co in the region at any three points, selecting a point that seemed to be an abnormal value at first glance was avoided.

The same procedure was followed to calculate an average value of atomic percentages of Co in a second tungsten carbide particle having a surface constituting the candidate region for the WC/WC interface. Finally, an average value of the average value of the atomic percentages of Co in the first tungsten carbide particle and the average value of the atomic percentages of Co in the second tungsten carbide particle was calculated as an "average value of atomic percentages of Co in tungsten carbide particles."

Based on the above result, the range of the average value of atomic percentages of Co in tungsten carbide particles±2 at % was determined as a region of a tungsten carbide particle. Further, a range departing from the average value±2 at % (that is, a range exceeding the average value+2 at %) was determined as a region in which the binder phase including Co was present. Then, a distance from a boundary surface between the region of the first tungsten carbide particle and the region where the binder phase was present to a boundary surface between the region of the second tungsten carbide particle and the region where the binder phase was present was determined as distance X between surfaces of the adjacent tungsten carbide particles. For example, in the graph shown in FIG. 2B, distance X is 3.5 nm.

(Calculating Ratio Nt/Na)

The same method was employed to also observe candidate regions for other WC/WC interfaces and subject them to the line analysis to determine an average value of atomic percentages of Co in tungsten carbide particles, and distance X. Subsequently, total number Na of WC/WC interfaces having distance X of 5 nm or less and number Nt of WC/WC interfaces having distance X of 1 nm or more and 5 nm or less and having therein an atomic percentage of Co higher than the average value of atomic percentages of Co in tungsten carbide particles were counted. In the present example, an atomic percentage higher than an "average value of atomic percentages of Co in tungsten carbide particles" was defined as a percentage departing from the range of the average value of the atomic percentages of Co±2 at % (that is, a percentage exceeding the average value of the atomic percentages of Co+2 at %). Then, the number of WC/WC interfaces corresponding to the above definition was counted as Nt. Finally, ratio Nt/Na was calculated based on Na and Nt counted. A result thereof is shown in Table 3.

<<Cutting Test>>

On a surface of each sample, a hard coating was deposited by ion-plating known as one type of PVD methods. The hard coating was a TiAlN coating having a thickness of 4 μm.

Each sample (a removable cutting tip) was actually used to conduct a cutting test under the following cutting conditions:

(Cutting Conditions)

Workpiece: a block material of S50C with φ20 holes equidistant by 10 mm

Cutting speed Vc: 200 m/min

Feeding rate f: 0.4 mm/rev

Cutting depth ap: 2.0 mm

Coolant: (Dry)

For evaluation, the workpiece was cut by 300 mm×10 paths, and a cutting distance before the tip was broken (maximum: 3000 mm) was measured eight times and from an average thereof an evaluation was made. A result thereof is also shown in Table 3. In the evaluation shown in Table 3, a ranking of S, A, B was made according to the following criteria.

Nt/Na

S: 0.95 or more and 1.0 or less

A: 0.9 or more and less than 0.95

B: less than 0.9

Cutting Evaluation

S: Cutting distance of 2500 mm or more

A: Cutting distance of 2000 mm or more and less than 2500 mm

B: Cutting distance of less than 2000 mm

TABLE 3

| sample Nos. | composition Nos. | manufacturing condition Nos. | Nt/Na | Nt/Na assessment | cutting assessment cutting distance (mm) | assessment | WC particle (μm) | area ratio (%) 1st hard phase composed of WC particles | binder phase including Co |
|---|---|---|---|---|---|---|---|---|---|
| C-1 | A-2a | B-1 | 0.88 | B | 1984 | B | 2.7 | 82 | 18 |
| C-2 | A-2a | B-2 | 0.86 | B | 1960 | B | 2.3 | 83 | 17 |
| C-3 | A-2a | B-3 | 0.84 | B | 1904 | B | 1.9 | 82 | 18 |
| C-4 | A-2a | B-4 | 0.92 | A | 2412 | A | 2.8 | 83 | 17 |
| C-5 | A-2a | B-5 | 0.88 | B | 1996 | B | 2.2 | 81 | 19 |
| C-6 | A-2a | B-6 | 0.98 | S | 2742 | S | 2.7 | 83 | 17 |
| C-7 | A-2a | B-7 | 0.95 | S | 2684 | S | 2.5 | 83 | 17 |
| C-8 | A-2a | B-8 | 0.93 | A | 2492 | A | 2.5 | 83 | 17 |

From the results shown in Table 3, it has been found that when the mixing step was performed with high-speed rotation (at 300 rpm or more) in a short time (for 30 minutes or more and less than 300 minutes), a more satisfactory Nt/Na and a more satisfactory cutting evaluation were obtained. It has also been found that when the sintering step and the cooling step were both performed for a long period of time, a more satisfactory Nt/Na and a more satisfactory cutting evaluation were obtained.

From the results shown in Table 3, it has been found that when ratio Nt/Na was 0.9 or more, a satisfactory result of a cutting distance of 2000 mm or more was obtained and tungsten carbide particles, and an area ratio of each of the first hard phase composed of tungsten carbide particles, the binder phase including Co, and the second hard phase. A result thereof is shown in table 4. Further, similarly as done in Test Example 1, ratio Nt/Na was determined for each sample. A result thereof is also shown in Table 4.

TABLE 4

| sample Nos. | composition Nos. | manufacturing condition Nos. | Nt/Na | Nt/Na assessment | WC particle diameter (μm) | area ratio (%) 1st hard phase composed of WC particles | binder phase including Co | 2nd hard phase |
|---|---|---|---|---|---|---|---|---|
| D-1 | A-1 | B-4 | 0.91 | A | 2.5 | 91 | 9 | — |
| D-2a | A-2a | B-4 | 0.92 | A | 2.8 | 83 | 17 | — |
| D-2b | A-2b | B-4 | 0.81 | B | 1.9 | 82 | 18 | — |
| D-2c | A-2c | B-4 | 0.87 | B | 2.4 | 82 | 18 | — |
| D-2d | A-2d | B-4 (mixed for 1 H) | 0.92 | A | 1.0 | 81 | 19 | — |
| D-2e | A-2e | B-4 (mixed for 4.5 H) | 0.92 | A | 4.8 | 84 | 16 | — |
| D-3 | A-3 | B-4 | 0.93 | A | 2.6 | 75 | 25 | — |
| D-4 | A-4 | B-4 | 0.94 | A | 2.2 | 83 | 8 | 9 |
| D-5 | A-5 | B-4 | 0.93 | A | 2.1 | 79 | 13 | 8 |
| D-6 | A-6 | B-4 | 0.92 | A | 2.2 | 74 | 17 | 9 |
| D-7 | A-7 | B-4 | 0.93 | A | 2.0 | 75 | 18 | 7 |
| D-8 | A-8 | B-4 | 0.93 | A | 2.0 | 75 | 17 | 8 |
| D-9 | A-9 | B-4 | 0.94 | A | 1.9 | 74 | 17 | 9 |
| D-10 | A-10 | B-4 | 0.93 | A | 2.0 | 75 | 17 | 8 | enhanced toughness and excellent breaking resistance were obtained. Furthermore, it has been shown that ratio Nt/Na and the cutting evaluation correlated to each other.

Test Example 2

In Test Example 2, cemented carbides of various compositions were produced and cutting tools (removable cutting tips) comprising substrates formed of the obtained cemented carbides were manufactured and assessed. Initially, as a powdery raw material, powdery materials having compositions and average particle diameters indicated in Table 1 were prepared. Subsequently, under manufacturing condition No. B-4 shown in table 2, the mixing, forming, sintering and cooling steps were performed to produce cemented carbides. Note that the raw materials of composition Nos. A-2d and A-2e underwent the mixing step for 1 hour and 4.5 hours, respectively, to produce cemented carbides. Powdery raw materials used for the second hard phase in Table 1 were the following products:

TiC: produced by Allied Material Corp., trade name: titanium carbide powder OR06

NbC: produced by Mitsui Mining & Smelting Co., Ltd., trade name: NbC (Ta-free)

ZrC: produced by Allied Material Corp., trade name: zirconium carbide powder OV25

TiN: produced by H.C. Starck GmbH, trade name: Titanium nitride (TiN)

TaC: produced by Mitsui Mining & Smelting Co., Ltd., trade name: TaC (Nb-free)

For each sample, similarly as done in Test Example 1, image analysis type particle size distribution analysis software ("Mac-View" manufactured by Mauntec Co., Ltd.) was used to determine an average particle diameter of sintered From a result shown in Table 4 it has been found that Sample Nos. D-1, D-2a, D-2d, D-2e, and D-3 to D-10 using tungsten carbide particles carbonized at high temperature and Co particles having an average particle diameter of 0.7 μm had ratio Nt/Na of 0.9 or more and were thus satisfactory cemented carbides.

Thus while embodiments and examples of the present invention have been described, it is also initially planned to combine configurations of the embodiments and examples, as appropriate.

It should be understood that the embodiment and example disclosed herein have been described for the purpose of illustration only and in a non-restrictive manner in any respect. The scope of the present invention is defined by the terms of the claims, rather than the embodiments and examples described above, and is intended to include any modifications within the meaning and scope equivalent to the terms of the claims.

REFERENCE SIGNS LIST 10a, 10b, 10c, 10d: tungsten carbide particles; 20ab, 20ac, 20ad: WC/WC interface; Lab, Lac, Lad: length along which tungsten carbide particles have surfaces facing each other; X, Xab, Xac, Xad: distance between surfaces of tungsten carbide particles.

The invention claimed is:
1. A cemented carbide comprising a first hard phase composed of tungsten carbide particles and a binder phase including Co,
    the cemented carbide having a ratio Nt/Na of 0.9 or more, where, in any surface or any cross section of the cemented carbide, a region in which there is a distance X of 5 nm or less between surfaces respectively of tungsten carbide particles adjacent to each other, the surfaces facing each other along a length L of 100 nm or more, is referred to as a WC/WC interface, and Na represents a total number of WC/WC interfaces and Nt represents a number of WC/WC interfaces having a distance X of 1 nm or more and 5 nm or less and having therein an atomic percentage of Co higher than an average value of atomic percentages of Co in the tungsten carbide particles.

2. The cemented carbide according to claim 1, wherein the ratio Nt/Na is 0.94 or more.

3. The cemented carbide according to claim 1, wherein the tungsten carbide particles have an average particle diameter of 0.5 μm or more and 5.0 μm or less.

4. The cemented carbide according to claim 1, wherein relative to any surface or any cross section of the cemented carbide the first hard phase has an area ratio of 70% to 95% and the binder phase including Co has an area ratio of 5% to 30%, and a sum of the area ratio of the first hard phase and the area ratio of the binder phase including Co is 100%.

5. The cemented carbide according to claim 1, further comprising a second hard phase composed of a compound including tungsten, one or more types of metal elements selected from Group 4 elements, Group 5 elements and Group 6 elements of the Periodic Table excluding tungsten, and one or more types of elements selected from C, N, O and B, wherein in the second hard phase, one or more types of metal elements selected from Group 4 elements, Group 5 elements and Group 6 elements of the Periodic Table excluding tungsten have a mass ratio of 20 mass % or more and less than 100 mass % relative to a total amount of tungsten and one or more types of metal elements selected from Group 4 elements, Group 5 elements and Group 6 elements of the Periodic Table excluding tungsten.

6. The cemented carbide according to claim 5, wherein the second hard phase includes at least Cr as one or more types of metal elements selected from Group 4 elements, Group 5 elements, and Group 6 elements of the Periodic Table excluding tungsten.

7. The cemented carbide according to claim 5, wherein relative to any surface or any cross section of the cemented carbide a sum of an area ratio of the first hard phase and an area ratio of the second hard phase is 70% to 95% and the binder phase including Co has an area ratio of 5% to 30%, and a sum of the area ratio of the first hard phase, the area ratio of the second hard phase and the area ratio of the binder phase including Co is 100%.

8. A cutting tool comprising the cemented carbide according to claim 1 as a substrate.

9. The cutting tool according to claim 8, further comprising a hard coating which coats at least a portion of a surface of the substrate.

* * * * *